(No Model.)
G. SEITZ, Dec'd.
Mary C. Seitz, administratrix.
METHOD OF AND APPARATUS FOR MASHING MALT AND MALT SUBSTITUTES.
No. 255,203. Patented Mar. 21, 1882.
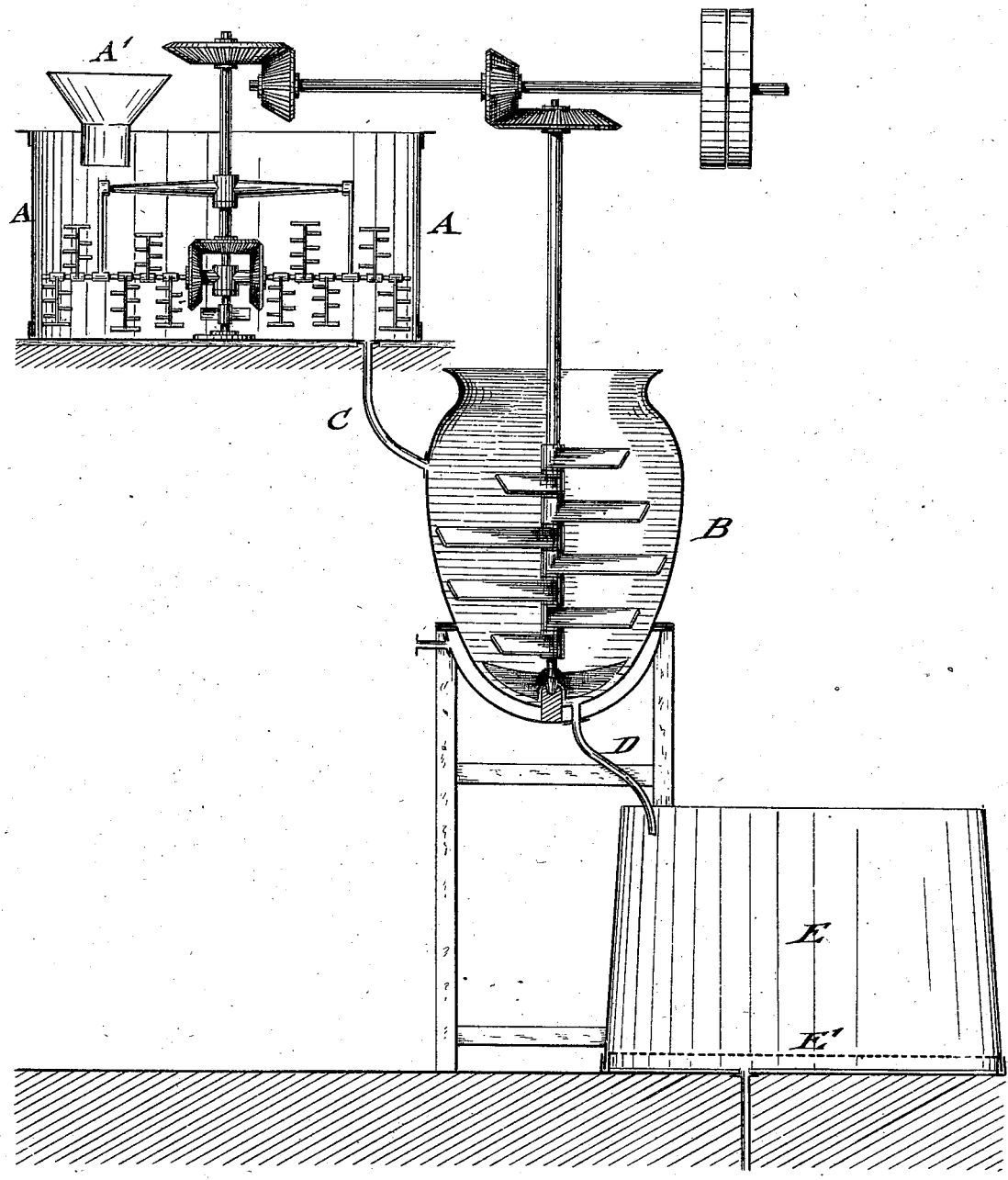

UNITED STATES PATENT OFFICE.

GEORGE SEITZ, OF NEW YORK, N. Y.; MARY C. SEITZ ADMINISTRATRIX OF SAID GEORGE SEITZ, DECEASED.

METHOD OF AND APPARATUS FOR MASHING MALT AND MALT SUBSTITUTES.

SPECIFICATION forming part of Letters Patent No. 255,203, dated March 21, 1882.

Application filed July 22, 1881. (No model.)

*To all whom it may concern:*

Be it known that I, GEORGE SEITZ, of the city, county, and State of New York, have invented certain new and useful Improvements in Methods of and Apparatus for Mashing Malt and Malt Substitutes, of which the following is a specification.

In the mashing of malt in the manufacture of beer the bruised malt is steeped with lukewarm water in a mash-tun which is provided with a stirring mechanism and a false perforated bottom, from whence a part is pumped into a kettle and exposed to boiling, then reconducted to the mash-tun, and there thoroughly stirred with the remaining portion of the mash. The pumping up of a portion of the mash and heating of the same in the kettle, then returning and mixing it with the remaining mash, is repeated several times, until the whole mash is brought to the temperature required for thoroughly dissolving the starch and changing it by heat into saccharine matter. This method of preparing the mash—the so-called "thick mash process"—is connected with considerable delay and difficulty, owing to the tedious pumping of the thick and unwieldy body of the mash. The thick mash is, moreover, not adapted for being mixed with raw unmalted material, such as corn-meal or other malt substitutes which are now extensively employed in the manufacture of fermented liquors, as these substitutes are liable to settle on the bottom of the mash-tun and clog the perforations of the same.

To overcome the last-mentioned difficulty, processes have been devised by which, after the mash is saccharified, the whole mass is boiled *in vacuo* and under pressure and finally a small percentage of malt again added for saccharification. This is objectionable, because the high temperature of boiling under pressure destroys the albumenoids and peptones contained in the malt substitutes, which are the necessary yeast-food for a sound and vigorous fermentation. The high heats also cause the disintegration of cellulose and dissolve the mucilaginous portions of the grain, which necessitates the filtration to be done under pressure, and produces a malt-liquor which does not fine, and which is liable to run into the acetic fermentation. The processes referred to require, furthermore, complicated and expensive apparatus, and do not permit the use of the ordinary plant of a brewery.

The object of this invention is to facilitate and expedite the process of mashing malt and malt substitutes, so that not only time is economized in the manufacture of beer, but also the capacity of the brewery increased, while, furthermore, by my method of mashing malt and malt substitutes a better keeping and cheaper beer is obtained.

The invention consists of substituting for the combined mashing, settling, and draining tun heretofore used an auxiliary mash-tun above the level of the saccharification vessel or kettle, and arranging a separate settling and draining tun with a perforated false bottom below the kettle.

It consists, secondly, of treating the malt and malt substitutes by successive steps in such a manner that the conversion of the starch into dextrine and saccharine matter is accomplished in the saccharification-vessel before the mash passes into the draining and settling tun, where it is drained off in the usual manner for further treatment in the brewing process.

The accompanying drawing represents a sectional elevation, showing the improved plant employed in my process for mashing malt and malt substitutes.

A represents an auxiliary mash-tun, into which the crushed malt is conducted by a hopper, A'. The mash-tun A is provided with the usual stirring mechanism for agitating the malt after it is steeped with lukewarm water. Below the mash-tun A is arranged a steam-jacketed saccharification vessel or kettle, B, which is provided with a suitable interior agitating mechanism. The auxiliary mash-tun is connected with the kettle by a pipe, C, so that the contents of the mash-tun can be discharged into the kettle, as required. Below the kettle, and connected therewith by a pipe, D, is arranged a settling and draining tun, E, of the ordinary construction, having a false perforated bottom, E'.

In mashing malt alone according to my process the malt is first steeped in the auxiliary mash-tun with lukewarm water and thoroughly stirred by the agitating mechanism, then allowed to stand for an hour until the malt is thoroughly saturated. Then a portion of mash, preferably the settlings, is dropped into the saccharification-kettle and the heat gradually raised to the boiling-point. Then the remaining portion of the mash is dropped into the kettle and thoroughly mixed with the boiled portion until the temperature is reduced below the temperature required for the saccharification of the starch. The entire mass in the kettle is then slowly raised to a temperature of 160° to 170° Fahrenheit, so as to effect the complete conversion of the starch contained in the malt into saccharine matter. The mass is then conducted into the draining and settling tun and the extract run off and boiled with hops in the usual manner.

The advantage of this process of mashing is that the heats to which the mash is exposed are completely within control, either as to the formation of saccharine matter or of dextrine; also, that the use of the auxiliary mash-tun dispenses with the pumping of the mash and expedites the mashing process. When malt substitutes—such as corn-meal or other raw unmalted grain—are used a portion of the mash is dropped from the auxiliary mash-tun into the saccharification-kettle B, and therein mixed with the raw material, and gradually brought under continual stirring, so as to prevent settling and burning, to the boiling-point by the application of steam for a sufficient time to thoroughly dissolve the starch. The remaining portion of the mash in the mash-tun A is then dropped into the kettle and mixed with the boiled mash therein, which reduces the temperature of the mass below the saccharification temperature. The temperature of the whole mass is then gradually raised again and retained at about 160 to 170° Fahrenheit, so as to completely effect the conversion of the starch of the corn-meal or other malt substitute into dextrine and saccharine matter before the mass is conducted off into the settling and draining tun. When the conversion is completed the contents of the saccharification-kettle are allowed to run off into the settling and draining tun E, whence the extract is drawn off in the ordinary manner for further use.

As the starch of the corn or other malt substitute is thoroughly dissolved and saccharified before entering the draining and settling tun, the raw material cannot clog the false bottom of the same, so as to delay the mashing process, as has been the case heretofore. It also admits the use of a much larger percentage of malt substitutes, owing to the more complete conversion of the starch and gum and the more convenient handling of the same. Another advantage is that there is no pumping back of the thick mash from the mashing-tun to the saccharification-vessel, and that, furthermore, by the employment of the auxiliary mash-tun above the kettle the capacity of the brewery is increased, as the second mash can be prepared and boiled while the first mash is draining off in the draining and settling tun below the kettle.

Having thus described my invention, I claim as new and desire to secure by Letters Patent—

1. As an improvement in apparatus for mashing malt or malt substitutes, the combination of a steam-jacketed saccharification-vessel having an interior stirring mechanism, an auxiliary mash-tun arranged above the level of the vessel, also provided with a stirring mechanism, a settling and drawing-off tun arranged below the level of the saccharification-vessel and provided with a perforated false bottom, and pipes connecting the vessel and mash-tun and vessel and settling-tun, substantially as described.

2. The process of mashing malt and unmalted malt substitutes, consisting in first steeping the malt in lukewarm water under agitation, then allowing it to stand for an hour or so, then mixing a portion thereof with a quantity of raw unmalted grain and subjecting the mixture, under continual stirring, to a boiling temperature at the ordinary atmospheric pressure, then adding the unboiled portion of the original mash and mixing the whole together until the temperature is reduced below a saccharification temperature, then slowly increasing the heat of the entire mass to a temperature of 160° to 170° Fahrenheit, and finally conducting off and draining the mass, substantially as described.

In testimony that I claim the foregoing as my invention I have signed my name, in presence of two witnesses, this 18th day of July, 1881.

GEORGE SEITZ.

Witnesses:
PAUL GOEPEL,
CARL KARP.